W. FRY.
NUT LOCK.
APPLICATION FILED DEC. 19, 1911.
1,022,542.
Patented Apr. 9, 1912.
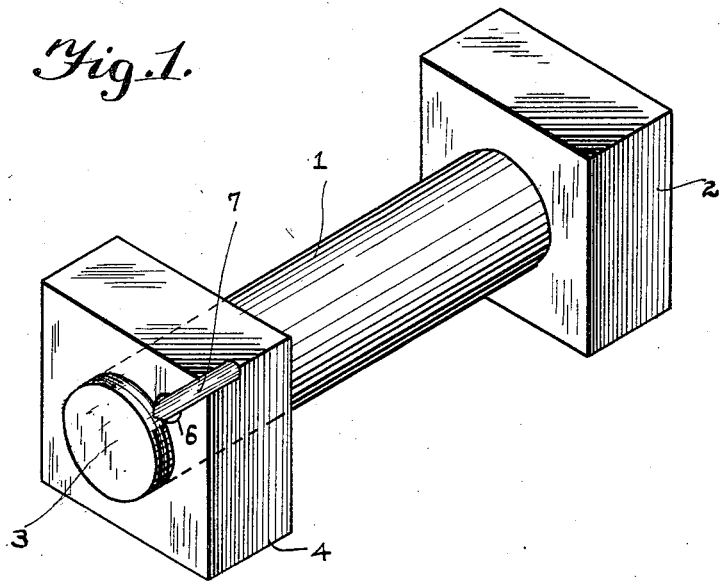
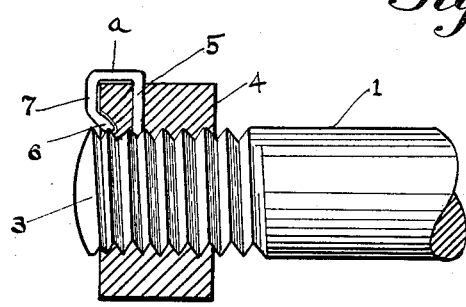
WITNESSES
INVENTOR
William Fry.
By _____ Attorney

UNITED STATES PATENT OFFICE.

WILLIAM FRY, OF EDINBURG, VIRGINIA.

NUT-LOCK.

1,022,542. Specification of Letters Patent. Patented Apr. 9, 1912.

Application filed December 19, 1911. Serial No. 666,828.

*To all whom it may concern:*

Be it known that I, WILLIAM FRY, a citizen of the United States, residing at Edinburg, in the county of Shenandoah and State of Virginia, have invented certain new and useful Improvements in Nut-Locks; and I do hereby declare the following to be a full, clear, and exact description of the invention, such as will enable others skilled in the art to which it appertains to make and use the same.

My invention relates to certain new and useful improvements in nut locks, and has for its object to provide a nut lock which shall be exceedingly simple of construction and readily applied.

With these ends in view my invention consists in the construction and arrangement hereinafter more fully set forth.

In order that those skilled in the art to which my invention appertains may know how to make and use my invention and to fully realize its advantages, I will proceed to describe the same, referring by numerals to the accompanying drawing in which:

Figure 1 is a perspective view of a bolt with my improved nut applied thereto, and Fig. 2 is a detail longitudinal section of the screw threaded end of a bolt and a nut secured in locked position thereon.

Similar reference numerals indicate like parts in both figures of the drawing.

1, represents an ordinary railroad bolt having the usual head 2, and screw threaded end 3, adapted to receive the securing nut.

4, is my improved nut formed with a passage 5, preferably from the corner diagonally to and through the female thread, and also with a recess 6 in its outer face, leading to and through the female thread.

7 is a steel wire in cross section adapted to pass within and through the passage 5 and recess 6, and to finally assume the position shown best at Fig. 2.

In the use of my invention the nut is screwed to its proper position upon the end of the bolt when the steel wire has one end driven through the passage 5 and into the thread of the bolt seating itself therein; the outer end of the wire is then bent outwardly and returned into the recess 6 and is driven in until it is seated in the thread of the bolt at a point distant from the seat of the other end of said wire as most clearly shown at Fig. 2. When the nut has been thus secured in position it will be seen that the wire 6 constitutes a duplex locking bolt entering the threads of the screw bolt and effectually prevents the nut from working off. When it is desired to remove the nut it may be readily done by a blow with a hammer at the locality indicated at *a*, which will act to withdraw both legs of the wire from their seats in the threads of the bolt.

I have found from experience that while the ends of the wire may be firmly seated in the threads of the bolt and to such extent as to positively prevent the nut from rotation, the threads of the bolt are not mutilated to such an extent as to at all interfere with their function when a bolt is to be replaced.

From the construction shown and described, it will be readily understood that all ordinary nuts may be made to embrace my invention by simply drilling the passage 5 and recess 6 therein. While I have shown the passage 5 at the corner of the nut as the preferred locality, I do not wish to be limited in this respect as such passage may be located in one of the sides, the spirit of my invention residing in locking the nut at two localities in the thread of the bolt by a single locking wire.

Having described the construction and operation of my improvement, what I claim as new and desire to secure by Letters Patent is:—

1. A nut adapted to be locked in position upon a screw threaded bolt, consisting of a rectangular or polygonal body and having a passage extending from one of its sides or edges into and through the female thread, and a recess in its outer face extending to and through the female thread at a point distant from the passage from the edge of the nut, substantially as hereinbefore set forth.

2. In combination with a nut such as described provided with passages completely through one side or edge and its face, a steel wire adapted to having its opposite ends passed through the passages in the nut, substantially as and for the purpose set forth.

3. In combination with a screw threaded bolt, a nut having a female thread and passages leading from one side and the outer face through the female thread, and a steel wire having its opposite ends passing through the passages in the nut and seated at different localities in the male thread of the bolt, substantially as set forth.

In testimony whereof I affix my signature in presence of two witnesses.

WILLIAM FRY.

Witnesses:
A. PITT BOWERS,
J. M. GARBER.